April 14, 1959  E. L. CARPENTER ET AL  2,881,517
METHOD FOR TWISTING TUBING
Filed Sept. 6, 1956
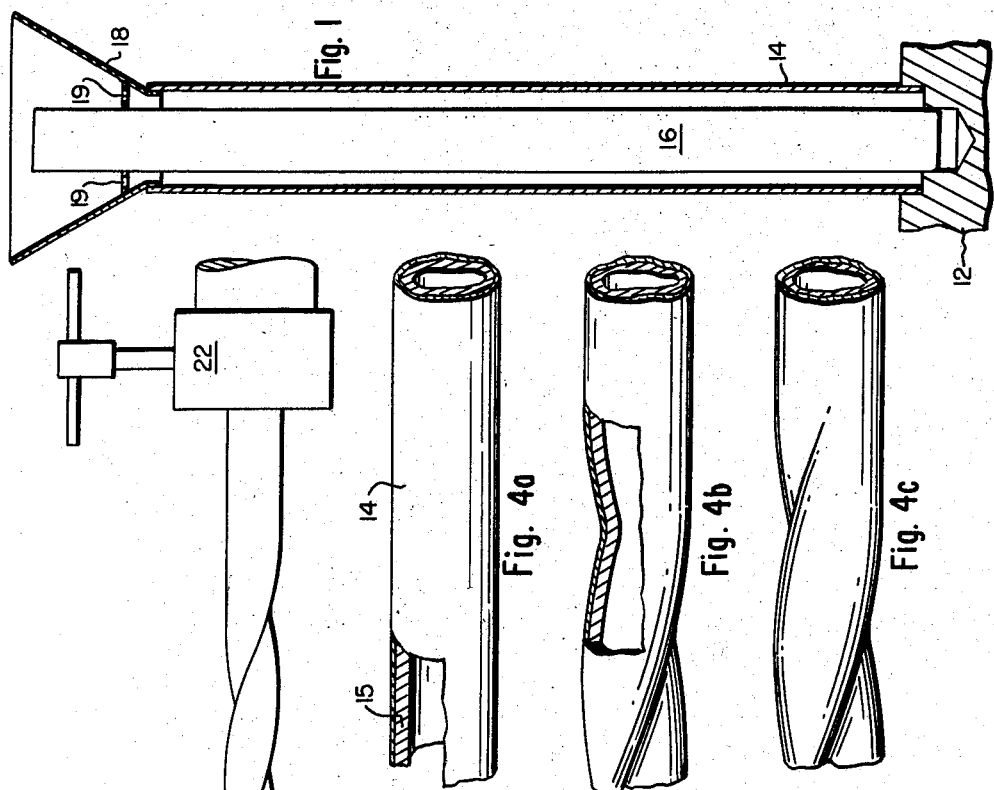
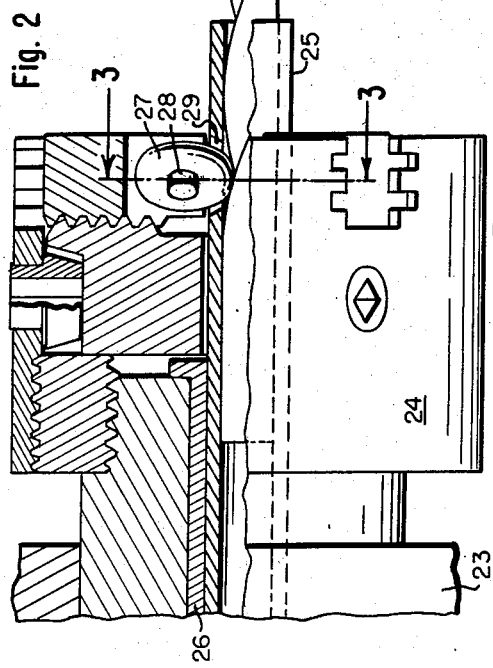
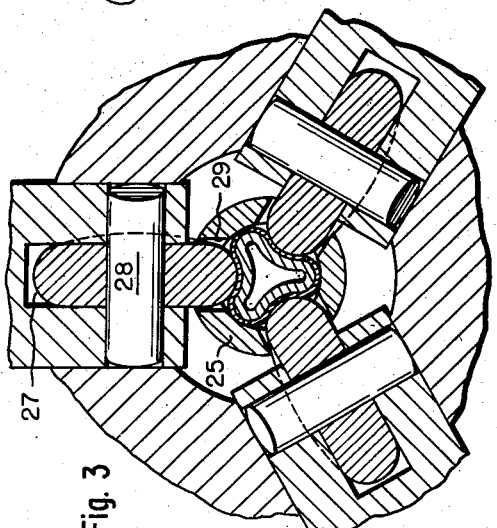
INVENTORS
EDWARD L. CARPENTER
WILLIAM H. WIEBER
BY SERGE S. WISOTSKY
ATTORNEYS

# United States Patent Office 2,881,517
Patented Apr. 14, 1959

2,881,517
METHOD FOR TWISTING TUBING

Edward L. Carpenter, Dorchester, William H. Wieber, Mansfield, and Serge S. Wisotsky, Stoughton, Mass., assignors, by mesne assignments, to American Radiator & Standard Sanitary Corporation, New York, N.Y., a corporation of Delaware Application September 6, 1956, Serial No. 608,358

5 Claims. (Cl. 29—423)

This invention relates in general to pressure gauges and in particular, to the fabrication of twisted Bourdon tubes for such gauges.

Bourdon tubes have long been used as pressure-responsive devices. Perhaps the most commonly known Bourdon gauge is one in which a tube of non-circular cross-section is bent into an arc. One end of the tube is closed and the other communicates with the enclosure wherein it is desired to measure pressure. An increase in pressure within the enclosure and thus within the Bourdon tube causes the non-circular cross-sectional shape of the tube to attempt to become circular. In consequence, the axis of the tube begins to straighten out. With the open end of the tube fixed against any movement, the straightening of the axis causes perceptible arcuate movement of the closed end of the tube. By means of suitable mechanical linkages, the movement of the closed end of the tube can be displayed on a calibrated indicating device.

In many instances, instead of the above arcuate or C shaped configuration it has been more desirable to form the Bourdon tube into a straight cylindrical configuration having circumferentially helical flutes. This structure resembles an axially straight-fluted cylinder twisted about its axis. When this so-called twisted Bourdon tube has one end closed and the other communicating with an enclosure, increasing internal pressure in the enclosure and in the Bourdon tube causes unwinding to occur. The degree of unwinding of the Bourdon tube is proportional to the amount of pressure exerted within the tube. The unwinding of the tube gives a useful rotational displacement which is often better adapted to actuating electrical and electromechanical devices for indicating pressure than is the arcuate motion of the bent-type Bourdon tube. In fact, the structure of some transducing devices permits coupling of an armature directly to the free end of the twisted Bourdon tube enabling pressure indications to be displayed locally and at remote points, if desired.

There has been encountered in the past a certain amount of difficulty in properly twisting Bourdon tubes for gauge usage. Depending upon the magnitude of the pressure to be measured and the degree of accuracy required, there are many variables to be considered. Not the least of these is the thickness of the blank tubing from which the Bourdon gauge is formed. If pressures to be measured are of the order of an atmosphere and the readings must be accurate to ±.1%, a metal tube of about ½" outside diameter and a wall thickness of .005" will perform satisfactorily. However, to twist a tube of so thin a wall successfully is a difficult task, indeed. Distortion of the tube resulting in non-uniform cross-sections and even complete collapse of the tube wall have occurred in some cases.

There have been proposed several techniques for producing tubular elements for Bourdon gauges without inordinate losses in scrap. One of the more promising techniques involves a preliminary longitudinal fluting of the tube to strengthen it prior to twisting. Some improvements in efficiency have been derived in this manner. Nevertheless, the fluting operation for lack of suitable techniques and apparatus has caused difficulties and a certain amount of additional loss is still encountered in subsequent twisting operations.

Therefore it is a primary object of the present invention to provide apparatus and a method for twisted Bourdon tubes for pressure gauges.

It is a further object to provide apparatus and a technique for efficiently and uniformly fluting and twisting thin-walled tubing.

It is a still further object to provide twisted Bourdon tube gauges having pressure-responsive characteristics which are consistent and reproducible.

In general, the present invention consists in a method and apparatus for efficiently fluting tubing for Bourdon gauges. The tubing used may be extremely thin-walled. To provide sufficient torsional strength to permit fluting the tubing is first lined with material of relatively low melting point. The liner is annular in cross-section rather than solid to provide an area into which material may flow when the tubing is subsequently fluted. Such a liner is formed by use of a jig which includes a central core fitting within the tubing.

For the subsequent fluting operation the lined tubing is placed in a machine and held stationary as fluting tools rotate and traverse the length of the tubing simultaneously. This results in helical flutes being formed in the tubing. The presence of the liner lends sufficient torsional strength to prevent distortion or crushing of the tubing. For a better understanding of the present invention together with objects, features and advantages, reference should be made to the following description of a preferred embodiment which should be read in conjunction with the accompanying drawings wherein:

Fig. 1 is a sectional view of the apparatus for lining the Bourdon tube,

Fig. 2 is a front view, partly in section, of the apparatus for fluting the Bourdon tube, Fig. 3 is a fragmentary doubled-size sectional end view of the chuck, guide sleeve, and fluting rollers, taken along the line 3—3 of Fig. 2, and Figs. 4a, 4b and 4c are views of the Bourdon tube at different stages of fabrication.

There is shown in Fig. 1 a preferred form of the apparatus for lining the metal tube which is to be fluted. A support fixture or plate 12 is drilled with two concentric holes. The outer hole has a diameter somewhat larger than the outside diameter of a metal tube 14, which permits tube 14 to be inserted in the hole and maintained in an upright position as shown. A solid core rod 16 is similarly accommodated in the inner hole and extends upwardly above tube 14. A funnel-shaped member 18, which is fitted fairly tightly over core rod 16, has an annular bottom surface. The minimum outside diameter of the funnel 18 is such that the lower end of the funnel fits snugly into metal tube 14. An array of ports or apertures 19 is formed in the annular bottom surface to permit liquid to flow from the funnel into the space between the solid core rod 16 and metal tube 14.

To provide a suitable lining within the tube 14, it is only necessary to melt liner material and pour it into funnel 18. The molten material flows through the ports 19 at the small end of funnel 18 and fills the area between the outside diameter of solid core rod 16 and the inside diameter of tube 14. It is desirable that a material of relatively low melting point be used for the lining material. A substance which has given excellent results for this purpose is that known by the trademark "Cerrobend." Cerrobend has a melting point of 158° F. and is composed of roughly 50% bismuth, 26% lead, 13% tin and 10% cadmium. When the lining material cools to room temperature, the entire assembly may be removed from support fixture 12. Solid core rod 16 may then be removed with funnel 18 from tube 14. The tube 14 is then ready for further processing.

Figs. 2 and 3 are illustrations of the apparatus used for the fluting operation. No basic structure other than the elements actually performing the fluting operation is shown. However, a horizontal milling machine, a lathe, or a drawing machine may be used successfully. The horizontal miller is preferred because the drive screw provides sufficient rotation of a chuck mounted on a dividing head on the movable table to give the desired pitch to the flutes.

In Fig. 2, a clamp 22 is shown for holding the tube to be fluted. Clamp 22 is rigidly attached to the frame of the machine and, considering the horizontal miller, would be held by the arbor support arm. The movable table (not shown) carries an index head 23 which is clamped firmly in place and which in turn supports a three-jawed chuck 24 which is fastened thereon. Passing through the center of the index head 23 and the chuck 24 is a guide sleeve 25 which is retained in position by a collet 26.

Mounted on each jaw of the chuck 24 is a fluting roller, of which roller 27 is typical. The axle 28 on which roller 27 turns is at a complementary angle to the axis of the tube being fluted, as are the axles of the other two fluting rollers. Three slots are cut in guide sleeve 25 and they are at the helix angle to the axis of the tube. As is clear in Fig. 2, the slot 29 accommodates the fluting roller 28. In Fig. 3, the accommodation of the other two fluting rollers by their respective slots is shown.

The fluting process is carried out by placing the metal tube 14, as it is shown in Fig. 4a, after the lining material 15 has cooled to room temperature and hardened, in the clamp 22 and locking it in position there. The table which supports index head 23 is moved toward clamp 22, the guide sleeve 25 sliding over the tube 14. The three jaws of chuck 24 are retracted from the tube during this preliminary movement.

When the table has been moved as close to clamp 22 as possible, the jaws of chuck 24 are tightened simultaneously causing each fluting roller to indent tube 14 to a depth of about 0.150". The lead screw of the miller is then engaged and withdrawal of the table supporting index head 23 with rotation of chuck 24 ensues. Guide sleeve 25 also rotates, of course, relative to tube 14.

The pitch of the lead screw and the gearing to chuck 24 is such that the chuck makes a full rotation for about each 3 or 4 inches of linear travel of index head 23. The indentations put in tube 14 by the tightening of three-jawed chuck 24 are thus drawn along tube 14 to form three helical flutes. Because the end of tube 14 within guide sleeves 25 is free, a slight amount of twisting of tube 14 occurs. However, because of the torsional strength and resilience of tube 14 plus liner 15, the twisting which takes place is of extremely small magnitude in comparison to the pitch of the fluting.

Impressing the three helical flutes in tube 14 results in a considerably decreased internal volume of tube 14. The fact that the lining material is annular having a hollow center permits this decrease in volume, the hollow core providing space into which the lining material can flow as it is forced inwardly by the fluting of the tube walls.

The sectional view, Fig. 3, shows the manner in which the three-jawed chuck is assembled about guide sleeve 25 and tube 14. It will be noted that the fluting tools are at an angle to planes which include the axis of tube 14. This angle is of course, directly related to the pitch angle of the lead screw of the miller in order that the roller-type fluting tools may trace symmetrical helical flutes. The manner in which guide sleeve 25 provides positive support against bending of tube 14, is clearly seen in Figs. 2 and 3. The openings such as 29 provide access for the fluting tool while the remainder of the internal wall surface of guide sleeve 25 retains tube 14 in position.

On completion of the fluting operations the liner material, which, as noted, melts at 158° F. may be removed very easily by immersing the fluted tube in a hot fluid or by other conventional means. After cleaning and calibration the tube is ready for incorporation in a pressure gauge.

It would be possible to achieve some of the objects of the invention by reinforcing the tubing to be fluted by an externally cast sleeve. However, for simplicity in carrying out the process, the internal liner is preferred.

Although what has been disclosed relates primarily to the fabrication of fluted elements for Bourdon gauges, the process has more general applications. The concept of reinforcing thin-walled tubing to prevent distortion of that tubing when it is worked, which reinforcement may be easily inserted and removed, is believed to be novel and subject to numerous modifications within the scope of the present invention. The invention should be limited only as necessitated by the breadth of the following claims.

What is claimed is:

1. The method of fabricating a helically fluted tubular element for a Bourdon gauge which comprises melting material of a lower melting point than said tubular element, placing a core rod centrally of said element, pouring said material while molten into the space between said core rod and the inner wall of said element to cast a liner of greater thickness than that of the original wall of said element, thereby to form a composite element the torsional strength of said composite element being greater than that of said tubular element, removing said core rod, holding said composite element in a fixed position, passing fluting tools over said composite element in helical paths to form parallel helical flutes therein, and heating said composite element above the melting point of said material to remove said liner.

2. The method of fabricating a tubular element for a Bourdon gauge which comprises melting material of a lower melting point than said tubular element, placing a core rod within said tubular element, pouring said material while molten into the space between said core rod and the inner wall of said element to form a composite structure of greater torsional strength than that of said tubuar element, removing said core rod to leave a liner of said material bonded to the inner wall of said tubular element, forming helical flutes in the outer surface of said composite structure, and heating said composite structure above the melting point of said material to remove said material by melting thereof.

3. The method defined in claim 2 wherein said core rod is placed centrally of said tubular element and said lining is cast to a greater thickness than that of the wall of said tubular element.

4. The method defined in claim 2 wherein said helical flutes are formed by passing fluting tools over said composite structure to produce flutes of a depth at least several times the thickness of the wall of said tubular element.

5. The method defined in claim 2 wherein the wall of said tubular element has a thickness of the order of 5/1000ths of an inch and in which helical flutes are formed therein of pitch greater than the amount of twisting of said tube.

References Cited in the file of this patent

UNITED STATES PATENTS

| | | |
|---|---|---|
| 214,874 | Beugnies | Apr. 29, 1879 |
| 282,879 | Garrett | Aug. 7, 1883 |
| 303,222 | Grom | Aug. 5, 1884 |
| 669,698 | Ivins | Mar. 12, 1901 |
| 1,189,675 | Fageol | July 4, 1916 |
| 1,396,918 | Brace | Nov. 15, 1921 |
| 1,951,063 | Reimann | Mar. 13, 1934 |
| 2,225,513 | Summers | Dec. 17, 1940 |
| 2,592,614 | Stoddard | Apr. 15, 1952 |
| 2,704,394 | Stewart | Mar. 22, 1955 |
| 2,740,454 | Fuchs | Apr. 3, 1956 |